United States Patent
King et al.

(10) Patent No.: US 9,497,285 B1
(45) Date of Patent: *Nov. 15, 2016

(54) CONNECTION BUCKETING IN MIRRORING ASYMMETRIC CLUSTERED MULTIPROCESSOR SYSTEMS

(71) Applicant: F5 Networks, Inc., Seattle, WA (US)

(72) Inventors: Anthony King, Seattle, WA (US); Paul Imre Szabo, Shoreline, WA (US); William Ross Baumann, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/871,453

(22) Filed: Sep. 30, 2015

Related U.S. Application Data

(63) Continuation of application No. 13/773,332, filed on Feb. 21, 2013, now Pat. No. 9,167,006.

(60) Provisional application No. 61/601,504, filed on Feb. 21, 2012.

(51) Int. Cl.
G06F 15/16 (2006.01)
H04L 29/08 (2006.01)
G06F 11/16 (2006.01)
G06F 11/20 (2006.01)

(52) U.S. Cl.
CPC ....... *H04L 67/2895* (2013.01); *G06F 11/1658* (2013.01); *G06F 11/203* (2013.01); *G06F 2201/805* (2013.01)

(58) Field of Classification Search
USPC .......................... 370/235, 229, 392; 709/227
See application file for complete search history.

(56) References Cited

U.S. PATENT DOCUMENTS

| | | |
|---|---|---|
| 5,513,314 A | 4/1996 | Kandasamy et al. |
| 6,539,425 B1 | 3/2003 | Stevens et al. |
| 8,555,350 B1 | 10/2013 | Shatzkamer |
| 8,904,028 B2 * | 12/2014 | Iannaccone ............ H04L 45/00 709/232 |
| 2005/0091396 A1 | 4/2005 | Nilakantan et al. |

(Continued)

OTHER PUBLICATIONS

Official Communication for U.S. Appl. No. 13/828,664 mailed on Feb. 25, 2015, 18 pages.

(Continued)

*Primary Examiner* — Kyung H Shin
(74) *Attorney, Agent, or Firm* — John W. Branch; Lowe Graham Jones PLLC

(57) ABSTRACT

Creating a connection between one of a first plurality of computing devices in a primary chassis and one of a second plurality of computing devices in a failover chassis. A first plurality of buckets may be associated with the primary chassis, a second plurality of buckets may be associated with the failover chassis, where the first plurality of buckets may correspond to the second plurality of buckets. One of the first plurality of computing devices may be associated with one of the first plurality of buckets, and can create a connection with attributes such that a disaggregator in the failover chassis routes the connection to one of the second plurality of computing devices, wherein the one of the second plurality of computing devices may be associated with a bucket of the second plurality of buckets that corresponds to the one of the first plurality of buckets.

20 Claims, 5 Drawing Sheets

(56) References Cited

U.S. PATENT DOCUMENTS

| | | | |
|---|---|---|---|
| 2005/0188109 A1* | 8/2005 | Shiga | H04L 47/263 709/239 |
| 2006/0171365 A1 | 8/2006 | Borella | |
| 2009/0083861 A1 | 3/2009 | Jones | |
| 2009/0247120 A1 | 10/2009 | Heutschi et al. | |
| 2009/0265467 A1 | 10/2009 | Peles | |
| 2010/0061394 A1 | 3/2010 | Sindhu et al. | |
| 2010/0287227 A1 | 11/2010 | Goel et al. | |
| 2010/0299451 A1 | 11/2010 | Yigang et al. | |
| 2011/0026403 A1* | 2/2011 | Shao | H04L 67/2895 370/235 |
| 2011/0185065 A1 | 7/2011 | Stanisic et al. | |
| 2011/0200054 A1 | 8/2011 | Craig et al. | |
| 2011/0202614 A1 | 8/2011 | Graig et al. | |
| 2011/0231649 A1 | 9/2011 | Bollay et al. | |
| 2011/0231652 A1 | 9/2011 | Bollay et al. | |
| 2011/0231653 A1 | 9/2011 | Bollay et al. | |
| 2012/0240184 A1 | 9/2012 | Thirasuttakorn et al. | |
| 2014/0006632 A1 | 1/2014 | Evens | |

OTHER PUBLICATIONS

Official Communication for U.S. Appl. No. 13/828,664 mailed on Dec. 18, 2015, 18 pages.

International Search Report and written Opinion for Application No. PCT/US2014/019129 mailed on Apr. 29. 2014, 9 pages.

Official Communication for U.S. Appl. No. 13/240.812 mailed on Oct. 13, 2015, 9 pages.

Official Communication for U.S. Appl. No. 13/240,812 mailed on Apr. 23, 2015, 11 pages.

Official Communication for U.S. Appl. No. 13/789,386 mailed on Aug. 11, 2015, 19 pages.

Official Communication for U.S. Appl. No. 13/789,386 mailed on Jan. 30, 2015, 22 pages.

"Deploying the BIG-IP LTM for Diameter Load Balancing" Deployment Guide, Version 1.0, Sep. 22, 2010, 21 pages.

"Diameter (protocol)," Wikipedia, the free encyclopedia, accessed Feb. 3, 2012, created Oct. 26, 2004, 10 pages http://en.wikipedia.org/wiki/Diameter_(protocol).

"Respond to server depending on TCP::client_port," DevCentral Forums, accessed Mar. 26, 2010 http://devcentral.f5.com/Default.aspx?tabid=53&forumid=5&tpage=l&v . . . .

Fajardo, V. I., "Open Diameter Software Architecture," Version 1.0.7, Jun. 25, 2004, 6 pages http://diameter.sourceforge.net/diameter-architecture/index.html, accessed Sep. 2, 2008.

Liu, J. et al., "Introduction to Diameter," IBM, Jan. 24, 2006, 11 pages http://www.ibm.com/developerworks/library/wi-diameter/index.html.

MacVittie, L., "Message-Based Load Balancing," F5, 2009, 9 pages.

Official Communication for U.S. Appl. No. 13/773,332 mailed Jan. 8, 2015, 20 pages.

Official Communication for U.S. Appl. No. 13/773,332 mailed Jun. 30, 2015, 5 pages.

* cited by examiner

CONNECTION BUCKETING IN MIRRORING ASYMMETRIC CLUSTERED MULTIPROCESSOR SYSTEMS

CROSS-REFERENCE TO RELATED APPLICATIONS

This Utility Patent Application is a Continuation of U.S. patent application Ser. No. 13/773,332 filed on Feb. 21, 2013, which is based on U.S. Provisional Patent Application No. 61/601,504, filed on Feb. 21, 2012, entitled "Connection Bucketing In Mirroring Asymmetric Clustered Multiprocessor Systems," the benefits of which are claimed under 35 U.S.C. §120 and §119(e), and which are both further incorporated by reference in their entireties.

TECHNICAL FIELD

The present embodiments relate generally to network communications, and more particularly, but not exclusively, to mirroring computing devices on a primary chassis to computing devices on a failover chassis.

TECHNICAL BACKGROUND

There is a persistent need for high availability computing services. Computing applications, including mission critical applications, are increasingly being processed by data centers, particularly as cloud computing architectures are embraced. At the same time, monolithic computing devices are being replaced with one or more chassis, each of which contains groups of less expensive computing devices, such as blade servers, operating in parallel.

Availability of a chassis is often improved by mirroring. For example, a primary chassis may be mirrored by a failover chassis, such that the failover chassis takes over processing for the primary chassis in the case of a device failure (or any other error) on the primary chassis. However, while a chassis may fail as a unit, it is also possible for one or more individual computing devices in the primary chassis to fail, while the remaining computing devices continue to function. Moreover, one or more computing devices on the failover chassis may fail. Mirroring between computing devices in these scenarios is an ongoing problem. Therefore, it is with respect to these considerations and others that the present embodiments are drawn.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the described embodiments, reference will be made to the following Detailed Description, which is to be read in association with the accompanying drawings, wherein.

DETAILED DESCRIPTION

Figure 1A:
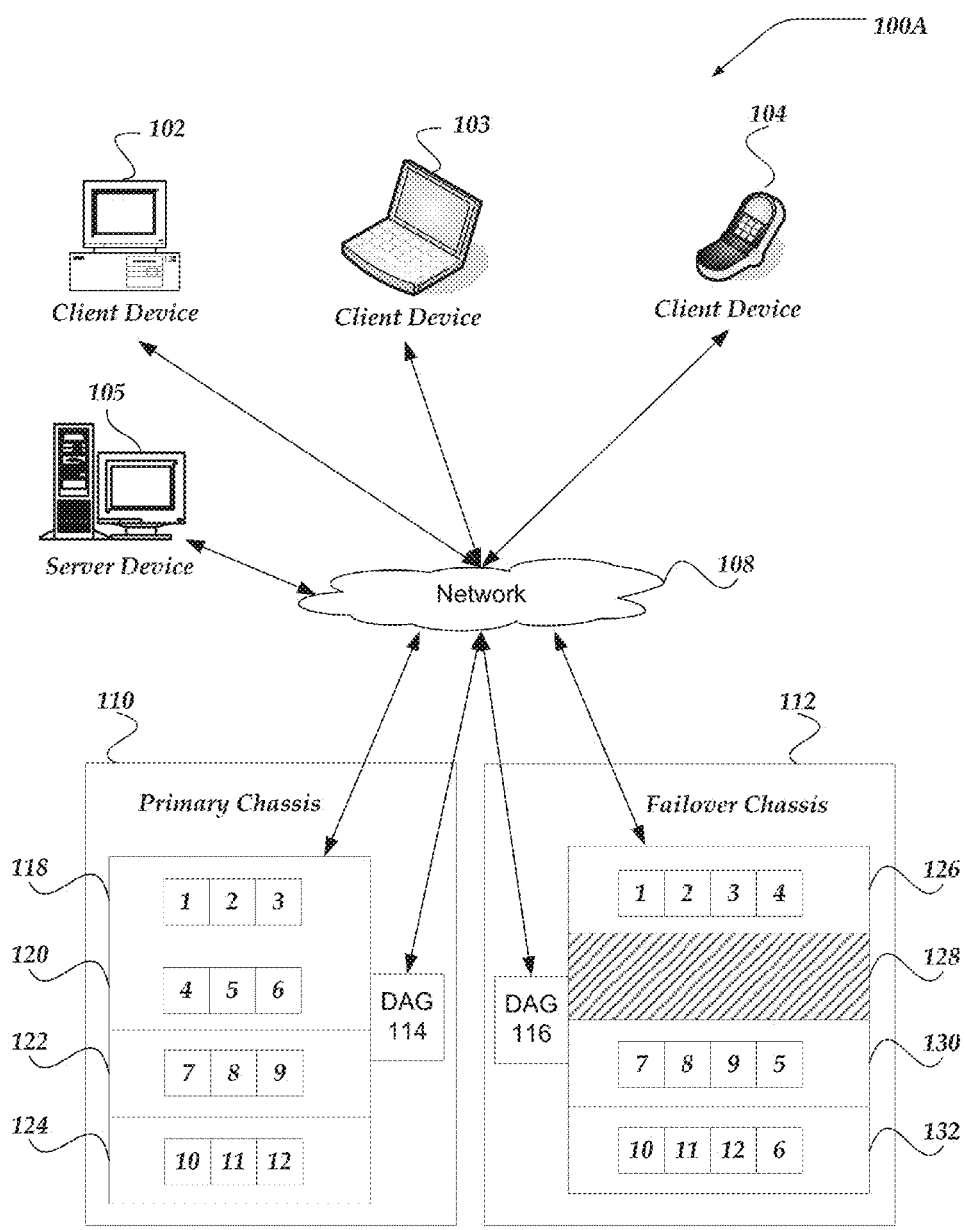
FIGS. 1A and 1B show components of an illustrative environment in which the described embodiments may be practiced.

In the following detailed description of exemplary embodiments, reference is made to the accompanied drawings, which form a part hereof, and which show by way of illustration examples by which the described embodiments may be practiced. Sufficient detail is provided to enable those skilled in the art to practice the described embodiments, and it is to be understood that other embodiments may be utilized, and other changes may be made, without departing from the spirit or scope. Furthermore, references to "one embodiment" are not required to pertain to the same or singular embodiment, though they may. The following detailed description is, therefore, not to be taken in a limiting sense, and the scope of the described embodiments is defined only by the appended claims.

Throughout the specification and claims, the following terms take the meanings explicitly associated herein, unless the context clearly dictates otherwise. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "network connection" (also referred to as a "connection") refers to a collection of links and/or software elements that enable a computing device to communicate with another computing device over a network. One such network connection may be a Transmission Control Protocol (TCP) connection. TCP connections are virtual connections between two network nodes, and are typically established through a TCP handshake protocol. The TCP protocol is described in more detail in Request for Comments (RFC) 793, available from the Internet Engineering Task Force (IETF), and is hereby incorporated by reference in its entirety. A network connection "over" a particular path or link refers to a network connection that employs the specified path or link to establish and/or maintain a communication.

As used herein, a chassis refers to an enclosure that houses a plurality of physical computing devices (hereinafter referred to as computing devices). In one embodiment, the computing devices may comprise blade servers, however any other type of computing device is similarly contemplated. In one embodiment, a chassis may include a disaggregator (DAG) as defined below.

As used herein, a disaggregator (DAG) refers to a computing device that routes incoming connections to one of a plurality of computing devices. In one embodiment, a DAG can route incoming connections to particular computing devices based on a hash algorithm and one or more attributes associated with the incoming connection. Attributes may include, but are not limited to, a source port, a destination port, an IP address, other connection fields associated with a connection, or the like. The source port and destination port as referenced herein refer to a TCP source port number and TCP destination port number, respectively. For example, the DAG may create a hash value by hashing a source (remote) port and a destination (local) port of the incoming connection. The DAG may then route the incoming connection to a particular computing device based on a predetermined mapping of hash values to buckets and an association between buckets and computing devices. Other techniques of routing incoming network connections to particular computing devices, including different hash algorithms, different attributes associated with the incoming connection, different algorithms for mapping hash values to buckets, and different techniques for mapping buckets to computing devices, are similarly contemplated.

As used herein, a bucket refers to a virtual connection destination. In one embodiment, a bucket may be associated with a particular computing device of a plurality of computing devices, however, the particular computing device the bucket is associated with may change over time. For example, a bucket may initially be associated with a first computing device, such that connections mapping to the bucket are routed to the first computing device. However, if the bucket becomes associated with a second computing device, existing and subsequent connections mapped to the bucket will be routed to the second computing device. In this way, connections may be routed to a consistently available entity, the bucket, regardless of the configuration or health status of the plurality of computing devices.

Briefly described is a mechanism for creating a connection between one of a first plurality of computing devices in a primary chassis and one of a second plurality of computing devices in a failover chassis. In one embodiment, a first plurality of buckets may be associated with the primary chassis, a second plurality of buckets may be associated with the failover chassis, and each of the first plurality of buckets may correspond to one of the second plurality of buckets. In one embodiment, one of the first plurality of computing devices may be associated with one of the first plurality of buckets, and can create a connection with attributes such that a disaggregator (DAG) in the failover chassis is caused to route the connection to one of the second plurality of computing devices, wherein the one of the second plurality of computing devices is associated with a bucket of the second plurality of buckets that corresponds to the one of the first plurality of buckets.

Illustrative Operating Environment

FIG. 1A shows components of an illustrative environment 100A in which the described embodiments may be practiced. Not all the components may be required to practice the described embodiments, and variations in the arrangement and type of the components may be made without departing from the spirit or scope of the described embodiments. FIG. 1A illustrates client devices 102-104, network 108, server device 105, and chassis 110 and 112.

Generally, client devices 102-104 may include virtually any computing device capable of connecting to another computing device and transmitting and/or receiving information. For example, client devices 102-104 may include personal computers, multiprocessor systems, microprocessor-based or programmable consumer electronics, network devices, server devices, virtual machines, and the like. Client devices 102-104 may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 102-104 may also include virtual computing devices running in a hypervisor or some other virtualization environment. As such, client devices 102-104 may range widely in terms of capabilities and features.

Network 108 is configured to couple network enabled devices, such as client devices 102-104 and chassis 110 and 112, with other network enabled devices. Network 108 is enabled to employ any form of computer readable media for communicating information from one electronic device to another. In one embodiment, network 108 may include the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs to enable messages to be sent from one to another. Also, communication links within LANs typically include fiber optics, twisted wire pair, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 108 may further employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, 4G, and future access networks may enable wide area coverage for network devices, such as client devices 102-104, or the like, with various degrees of mobility. For example, network 108 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link, a DSL modem, a cable modem, a fiber optic modem, an 802.11 (Wi-Fi) receiver, and the like. In essence, network 108 includes any communication method by which information may travel between one network device and another network device.

Server device 105 may include any computing device capable of communicating packets to another network device, such as, but not limited to chassis devices 110 and/or 112, and at least one of client devices 102-104. In one embodiment, server device 105 may be configured to operate as a website server. However, server device is not limited to web server devices, and may also operate a messaging server, a File Transfer Protocol (FTP) server, a database server, content server, and the like. Although FIG. 1A illustrates service device 105 as a single device, embodiments of the invention are not so limited. For example, server device 105 may include a plurality of distinct network devices. In some embodiments, each distinct network device may be configured to perform a different operation, such as one network device is configured as a messaging server, while another network device is configured as a database server, or the like.

Devices that may operate as server device 105 includes personal computers, desktop computers, multiprocessor systems, microprocessor-based or programmable consumer electronics, network PCs, server devices, and the like.

Each of chassis devices 110 and 112 may include a DAG and a plurality of computing devices. Chassis 110 includes DAG 114 and computing devices 118, 120, 122, and 124, while chassis 112 includes DAG 116 and computing devices 126, 128, 130, and 132. As described below, each computing device may be assigned one or more buckets. For example, as illustrated computing device 118 may be assigned buckets 1-3. In some embodiments, a computing device may fail such that no buckets are associated with the failed computing device, such as is illustrated by computing device 128.

While FIG. 1 illustrates each chassis physically housing a DAG and a plurality of computing devices, in another embodiment, the chassis and/or one of the components within the chassis may be virtual devices. For example, a virtual chassis may associate a physical DAG and a plurality of physical computing devices. Alternatively, one or more of the plurality of computing devices may be virtual machines in communication with a physical DAG and associated by a virtual chassis. In some embodiments, the functions of DAG 114 and DAG 116 may be implemented by and/or executed on a Field Programmable Gate Array (FPGA), application-specific integrated circuit (ASIC), in L2 switching hardware, network processing unit (NPU), or other computing device, such as DAG device 200 of FIG. 2.

Figure 1B:
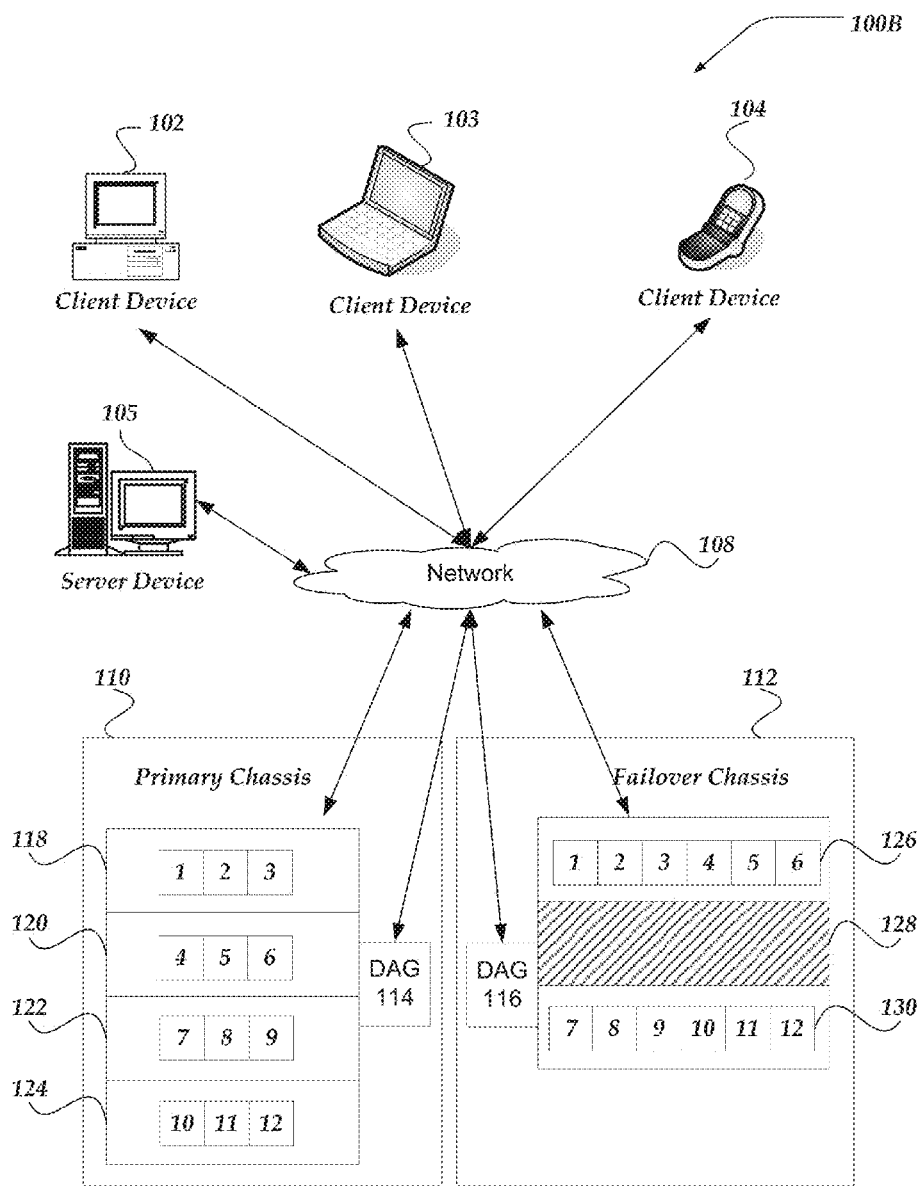

While chassis 110 and 112 are depicted containing the same number of computing devices, in another embodiment, chassis 110 and 112 may have different numbers of computing devices, such as is illustrated in FIG. 1B. In other embodiments, Chassis 110 may include 8 computing devices, while Chassis 112 may include 4 computing devices (not shown). However, the number of computing devices is not limited to a number that is a power of two—for instance a chassis may include 5 computing devices.

Each of computing devices 118, 120, 122, 124, 126, 128, 130, and 132 may include one or more processor cores (not shown). In one embodiment, each processor core operates as a separate computing device. For example, a computing device that includes 4 cores may operate, and be treated by a DAG, as 4 separate computing devices. Thus, throughout this disclosure, any reference to a computing device also refers to one of many cores executing on a computing device. In one embodiment, a computing device may be designed to fail as a unit. In this embodiment, a failure to a particular computing device may cause all processor cores included in that computing device to fail.

In some other embodiments, each of computing devices 118, 120, 122, 124, 126, 128, 130, and 132 may include a separate DAG. In one such embodiment, each DAG may correspond to one or more computing devices. In some embodiments, a combined computing device and DAG may share a processor core or utilize separate processor cores to perform actions of the computing device and the DAG as described in more detail below.

Illustrative Disaggregator Device Environment

Figure 2:
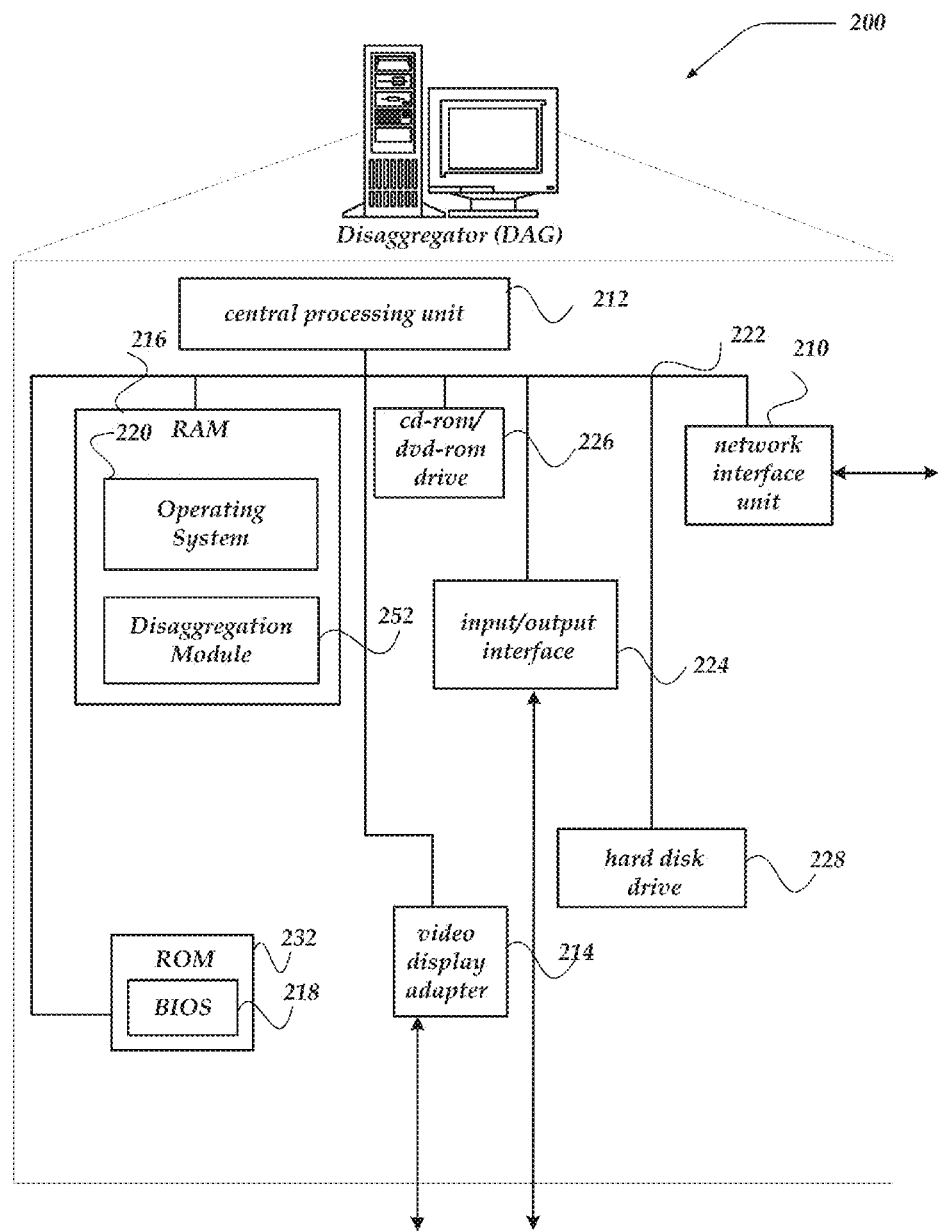
FIG. 2 illustrate one embodiment of a disaggregator device.

FIG. 2 illustrates one embodiment of disaggregator (DAG) device. DAG device 200 may include many more or less components than those shown. The components shown, however, are sufficient to disclose an illustrative embodiment. DAG device 200 may represent, for example, DAG 114 or DAG 116 of FIG. 1. However, the invention is not so limited and an FPGA, ASIC, L2 switching hardware, NPU, or the like may be utilized to implement the functions of a DAG, such as DAG 114 or DAG 116 of FIG. 1.

DAG device 200 includes central processing unit 212, video display adapter 214, and a mass memory, all in communication with each other via bus 222. The mass memory generally includes Random Access Memory (RAM) 216, Read Only Memory (ROM) 232, and one or more permanent mass storage devices, such as hard disk drive 228, tape drive, Compact-Disc ROM (CD-ROM)/Digital Versatile Disc ROM (DVD-ROM) drive 226, and/or floppy disk drive. Hard disk drive 228 may be utilized to store, among other things, the state of connections routed by the DAG, health status of the chassis the DAG is housed in or associated with, and the like. The mass memory stores operating system 220 for controlling the operation of DAG device 200. Basic input/output system ("BIOS") 218 is also provided for controlling the low-level operation of DAG device 200. DAG device 200 also includes Disaggregation module 252.

As illustrated in FIG. 2, DAG device 200 also can communicate with the Internet, or some other communications network via network interface unit 210, which is constructed for use with various communication protocols including the TCP/IP protocol. Network interface unit 210 is sometimes known as a transceiver, transceiving device, or network interface card (NIC).

DAG device 200 may also include input/output interface 224 for communicating with external devices, such as a mouse, keyboard, scanner, or other input/output devices not shown in FIG. 2.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices, or any other non-transitory medium which can be used to store the desired information and which can be accessed by a computing device.

The mass memory also stores program code and data. Disaggregation module 252 is loaded into mass memory and run on operating system 220. In one embodiment, disaggregation module 252 may receive a connection, map the connection to a bucket based on one or more attributes associated with the connection, and route the connection to a computing device associated with the bucket. Further details of the disaggregation module 252 are as discussed below in conjunction with FIG. 4.

Illustrative Computing Device Environment

Figure 3:
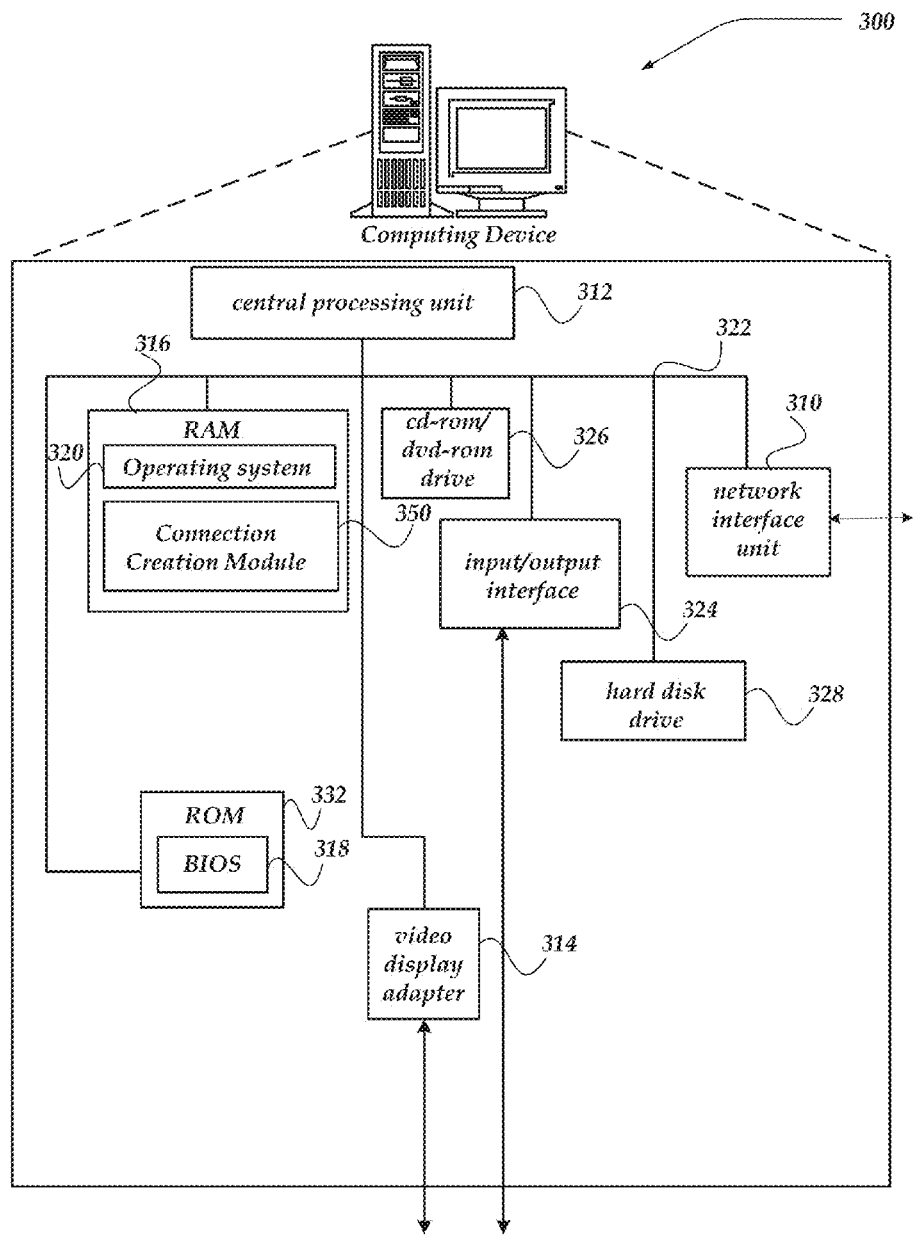
FIG. 3 illustrates one embodiment of a computing device.

FIG. 3 illustrates one embodiment of a computing device. Computing device 300 may include many more components than those shown. The components shown, however, are sufficient to disclose an illustrative embodiment for practicing the embodiments. Computing device 300 may represent, for example, one of computing devices 118, 120, 122, 124, 126, 128, 130, or 132 of FIG. 1.

Computing device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, CD-ROM/DVD-ROM drive 326, and/or floppy disk drive. The mass memory stores operating system 320 for controlling the operation of server device 300. BIOS 318 is also provided for controlling the low-level operation of computing device 300. As illustrated in FIG. 3, computing device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

Computing device 300 may also include input/output interface 324 for communicating with external devices, such as a mouse, keyboard, scanner, or other input devices not shown in FIG. 3.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices, or any other non-transitory medium which can be used to store the desired information and which can be accessed by a computing device.

Connection creation module 350 may be loaded into mass memory and run on operating system 320. In one embodiment, connection creation module 350 can create a connection to another chassis, such as a failover chassis. In one embodiment, connection creation module 350 can create the connection with attributes such that the DAG of the other chassis will route the connection to a computing device associated with a particular bucket. In one embodiment, this bucket may correspond to a bucket the computing device 300 is associated with. Connection creation is discussed in more detail in conjunction with FIG. 4.

In one embodiment, the computing device 300 includes at least one Application Specific Integrated Circuit (ASIC) chip (not shown) coupled to bus 322. The ASIC chip can include logic that performs some of the actions of computing device 300. For example, in one embodiment, the ASIC chip can perform a number of packet processing functions for incoming and/or outgoing packets. In one embodiment, the ASIC chip can perform at least a portion of the logic to enable the operation of connection creation module 350.

In one embodiment, computing device 300 can further include one or more field-programmable gate arrays (FPGA) (not shown), instead of, or in addition to, the ASIC chip. A number of functions of the computing device can be performed by the ASIC chip, the FPGA, by CPU 312 with instructions stored in memory, or by any combination of the ASIC chip, FPGA, and CPU.

Generalized Operation

Figure 4:
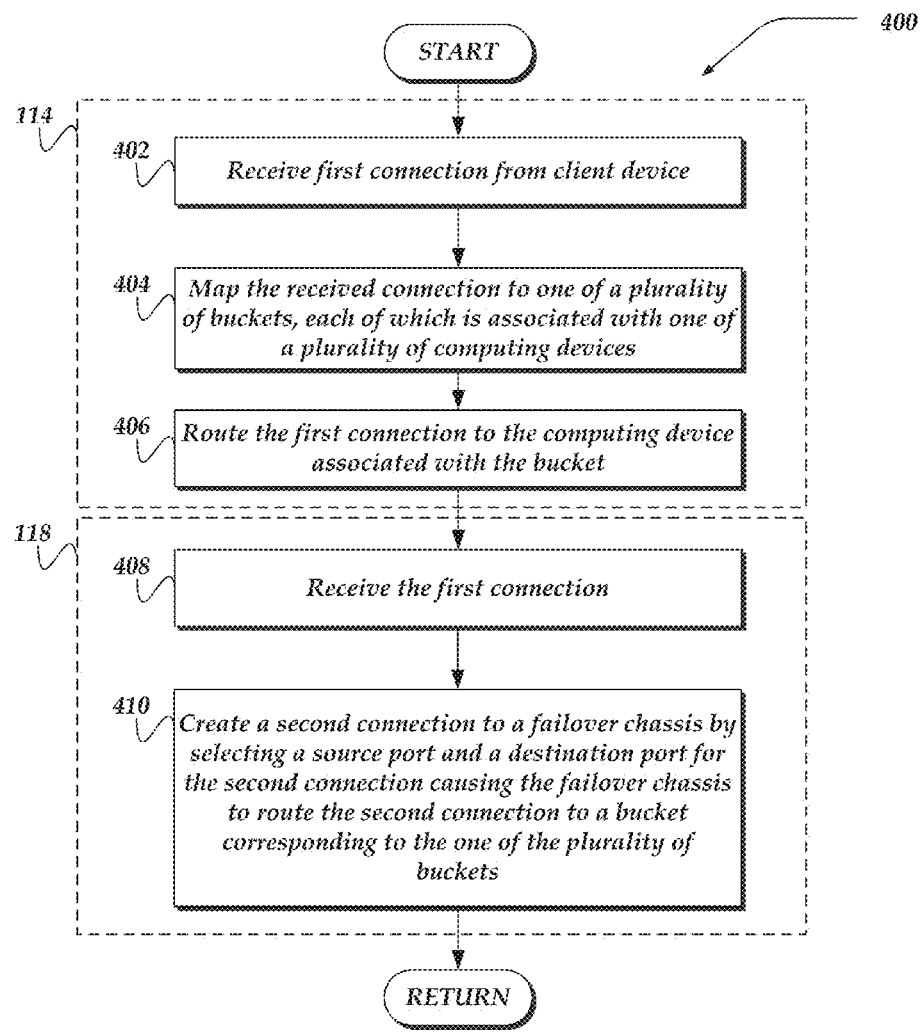
FIG. 4 illustrates a logical flow diagram generally showing one embodiment of a process for creating a connection from a primary chassis to a failover chassis.

The operation of certain aspects will now be described with respect to FIG. 4. FIG. 4 illustrates a logical flow diagram generally showing one embodiment of a process for creating a connection from a primary chassis to a failover chassis. In one embodiment, process 400 may be implemented by chassis 110 of FIG. 1. In another embodiment, blocks 402, 404, and 406 may be implemented by DAG 114 of FIG. 1, while blocks 408 and 410 may be implemented by one of computing devices 118, 120, 122, or 124 of FIG. 1. Further, blocks 402, 404, and 406 may be implemented for each packet of each connection.

Process 400 begins, after a start block, at block 402 where, in one embodiment, packets of a first connection are received from a client device, such as one of client devices 102-104 of FIG. 1.

At block 404, in one embodiment, the packets of the first connection are mapped to one of a plurality of buckets, each of which may be associated with one of a plurality of computing devices. In one embodiment, if there are n computing devices in the plurality of computing devices, the plurality of buckets may contain n*(n−1) buckets. In this embodiment, when all of the plurality of computing devices are healthy and actively processing connections, and when buckets are distributed evenly over the plurality of computing devices, each computing device may be associated with (n−1) buckets. However, different numbers of buckets are similarly contemplated, including virtually any whole number. Different numbers of buckets may be determined using a variety of different methods, including: a factorial function (e.g., n!), maximum number of computing devices between the primary chassis and the failover chassis, least common multiple between a number of computing devices on the primary chassis and a number of computing devices on the failover chassis, a total number of computing devices between the primary and failover chassis, a randomly determined whole number greater than the greater of a number of computing devices on the primary chassis or a number of computing devices on the failover chassis, or the like. Also, uneven distributions of buckets over the plurality of computing devices are similarly contemplated, such as when the number of computing devices does not evenly divide the number of buckets, or when one computing device intentionally has a disproportionate number of connections routed to it.

In one embodiment, each DAG may maintain a health status of the associated chassis. In some embodiments, if a computing device within the chassis fails or otherwise becomes inaccessible, then the DAG may redistribute the buckets among the remaining "healthy" computing devices within the chassis. One non-exhaustive example of this bucket redistribute is illustrated in FIG. 1. In this non-exhaustive example, buckets 1-3 are assigned to the first computing device, buckets 4-6 are assigned to the second computing device, buckets 7-9 are assigned to the third computing device, and buckets 10-12 are assigned to the fourth computing device. However, if the second computing device fails, buckets 1-3 and 4 may be redistributed and assigned to the first computing device, buckets 7-9 and 5 may be redistributed and assigned to the third computing device, and buckets 10-12 and 6 may be redistributed and assigned to the fourth computing device. One of ordinary skill in the art would recognize that other redistributions of buckets between the "healthy" computing devices is possible.

In one embodiment, the packets of the first connection may be mapped to a bucket by applying a hash algorithm to a combination of one or more attributes associated with the packets of the first connection. In one non-limiting example, a source port (i.e., TCP source port number) and a destination port (i.e., TCP destination port number) may be combined into a single value that is hashed, and then, based on the hash result, mapped to one of the plurality of buckets. In some embodiments, the combination of the one or more attributes, such as a first attribute and a second attribute, may be determined based on a third attribute (e.g., attributes of a virtual LAN). In yet other embodiments, a plurality of hashing algorithms may be employed to map a plurality of connections to a bucket.

In one embodiment, the attributes of the packets of the first connection may be hashed using an algorithm that is indifferent to the order of the attributes. For example, if the source port is 4000 and the destination port is 80, then the result of combining and hashing these values is the same as combining and hashing a source port of 80 and a destination port of 4000. Hash algorithms having this property may enable DAGs in both the primary chassis and the failover chassis to use the same algorithm to map packets from the same connection to the same bucket. For example, if a connection from the primary chassis to the failover chassis has a source port of 4000 and a destination port of 80, then packets sent from the primary chassis to the failover chassis may have a source port of 4000 and a destination port of 80, while packets sent from the failover chassis to the primary chassis have a source port of 80 and a destination port of 4000. In this embodiment, the same algorithm can be used by DAGs of the primary chassis and the failover chassis to map any packet associated with the connection to corresponding buckets.

In one embodiment, the one or more attributes of the connection may be combined by converting each of the attributes to a string representation of a given length, sorting the string representations, and concatenating the sorted string representations. For example, a source port of 4000 may be converted to the string "04000" and a destination port of 80 may be converted to the string "00080". Sorting the strings yields {"00080", "04000"}, which may then be concatenated into the string "0008004000" and submitted to the hash algorithm. One of ordinary skill will appreciate that a source port of 80 and a destination port of 4000 would yield the same result: strings "00080" and "04000" would be sorted into {"00080", "04000"}, which when concatenated also yields the string "0008004000". In another embodiment, different given lengths of strings are also considered, such as 3, 10, 16, and virtually any other whole number. These examples are not to be construed as exhaustive or limiting; rather, virtually any combination of connection attributes may be utilized to map packets to a bucket. For example, other attributes that may be combined or otherwise hashed may include, but are not limited to, source port and IP address, destination port and IP address, source port and sequence number, or the like.

In one embodiment, each of the plurality of buckets may be numbered, and the result of the hash algorithm may map to a bucket by applying a modulo operation. Specifically, the hash result modulo of the number of buckets in the plurality of buckets may yield the number of the bucket. For example, if there are 12 buckets in the plurality of buckets, and the result of hashing "0008004000" is the number 12345678, 12345678 modulo 12 is 6, so source port 4000/destination port 80 maps to bucket number 6.

In some embodiments, one or more of the buckets may have a size that is different than a size of other buckets. In other embodiments, one or more buckets may have different characteristics, such as a second order hash function. Although one type of bucket hashing is described above, other types of "consistent hashes" may also be employed. Consistent hashes refer to hashing algorithms that may be utilized to divide traffic in a variety of ways, which may in some embodiments, be similar to a bucket. In one embodiment, consistent hashes may remap connections associated with a failed computing device to other computing devices without remapping other connections associated with the other computing devices.

At block 406, in one embodiment, the packets of the first connection are routed to the computing device associated with the bucket mapped to by the connection attributes. Continuing the example, if computing device 120 of FIG. 1 is associated with bucket number 6, then the packets of the first connection may be routed to computing device 120. However, if bucket number 6 were associated with any of the other computing devices, the packets of the first connection may be routed to the computing device that bucket number 6 is currently mapped to.

At block 408, the computing device associated with the mapped bucket receives the packets of the first connection.

At block 410, the computing device creates a second connection to a failover chassis. In one embodiment, the failover chassis may be associated with a plurality of buckets corresponding to the buckets associated with the primary chassis. For example, if the primary chassis has 12 buckets in the plurality of buckets, the failover chassis may also be associated with 12 buckets. In one embodiment, the 12 buckets associated with the primary chassis may be numbered, and the 12 buckets associated with the failover chassis may be similarly numbered.

In one embodiment, the computing device may create the second connection with attributes such that the failover chassis is caused to map the second connection to a bucket corresponding to a same bucket the packets of the first connection were mapped to. For example, if the packets of the first connection were mapped to bucket 6, then the computing device may select attributes of the second connection such that the failover chassis may map the connection to bucket 6 of the failover chassis. In some embodiments, the second connection between the primary chassis and the failover chassis may be hashed to a same bucket as if the second connection was hashed had it arrived on the failover chassis from the client device.

In one embodiment, the primary chassis may select attributes for the second connection by randomly selecting attributes and, using a guess and check technique, submitting them to the same algorithm used by the secondary chassis to map connections to buckets. Randomly selected attributes may be processed in this manner until a combination of attributes is identified that maps to the desired bucket. Continuing the example, the packets of the first connection may be mapped to bucket 6, and so the computing device may randomly select source and destination ports and apply the algorithm used by the secondary chassis until a combination of attributes is found that also map to bucket 6. For example, the computing device may select, at random, source port 4444 and destination port 5555, combine them, hash the combination, and modulo the result with 12 (the number of buckets in each plurality of buckets) to yield a bucket number. If the bucket number yielded is anything other than 6, then another set of source and destination ports may be selected and the algorithm applied until a source and destination port mapping to bucket 6 are identified.

In one embodiment, the computing device may select the destination port to be the destination port of the packets of the first connection. For example, if the packets of the first connection have a destination of port 80, commonly used to receive HTTP requests, the computing device may select port 80 as the destination port of the second connection. In this embodiment, the computing device may randomly test source ports until one is found that, when combined with the destination port, will cause the second connection to be mapped to the desired bucket.

In some embodiments, the source port may be selected based on source port values that, when combined with other attributes, are known to map to buckets. In one embodiment, source port values known to map to buckets may be stored in a database and/or lookup table. In another embodiment, a portion of the bits representing source port values that are known to not map to buckets may be masked. In at least one embodiment, source port values known to map to buckets may be tested that, when combined with other attributes, will cause the second connection to be mapped to the desired bucket.

In one embodiment, combinations of attributes that map to a desired bucket may be pre-computed. In one embodiment, a plurality of combinations of attributes may be pre-computed for each bucket in the plurality of buckets. Then, when the packets of the first connection are received, the attributes of the second connection may be selected from a list of pre-computed values, obviating the need to perform the guess and check technique in real time.

In one embodiment, the attributes of the second connection may include a source port and a destination port. In one embodiment, the computing device may use both the source port and the destination port of the packets of the first connection when creating the second connection. In one embodiment, since the same algorithm is used to map connections to buckets in both chassis, using the same source port and destination port for the second connection may ensure the second connection is mapped to the same bucket as the first chassis. However, it will be appreciated that the client device's source port may not be available to the computing device. For example, when multiple client devices open connections having the same source and destinations ports, only one connection between a computing device in the primary chassis may use the same ports. Other connections between the computing device and the failover chassis typically have other ports assigned, as discussed above.

In one embodiment, the failover chassis may use an algorithm similar to the algorithm described in conjunction with block 404 to route the second connection to one a plurality of computing devices associated with the failover chassis. For example, a health status of the failover chassis may be used to index into a table that determines, for a given bucket, which computing device to route the second connection to. Thus, if the health status of the failover chassis were to change, the computing device associated with the mapped bucket may change such that subsequent connections to the mapped bucket are routed to a different computing device, and such that packets associated with existing connections may be mapped to a different computing device.

In at least one embodiment, the failover chassis may employ a same algorithm for hashing and routing packets of the second connection to a corresponding bucket of the second plurality of buckets of the failover chassis as an algorithm employed by the primary chassis for hashing and routing the packets of the first connection to one of the plurality of buckets associated with the primary chassis. In another embodiment, the hashing and routing algorithms employed by the primary chassis and the failover chassis may be different. In one such embodiment, the primary chassis may convey hashing and routing algorithms to the failover chassis for hashing and routing packets of the second connection to a corresponding bucket of the second plurality of buckets of the failover chassis.

In some embodiments, the algorithm utilized by the failover chassis and/or computing device information about the failover chassis (e.g., a number of cores in the failover chassis) may be employed to enable the primary chassis to infer information about how the failover chassis bucketizes its incoming packets. In one embodiment, if the second connection hash attributes match the bucket selection of the packets of the first connection on both the primary and failover chassis, then required information may be available in a correct location on the failover chassis (e.g., a computing device associated with a corresponding bucket).

In some embodiments, a second connection may be reestablished with the failover chassis. In one embodiment, if the second connection is lost, dropped, or otherwise disconnected, then the primary chassis may reestablish the second connection and convey current connection information to the failover chassis. In some embodiments, a second connection may be lost if a state change occurs on the failover chassis, such as, but not limited to, if a computing device within the failover chassis fails. In one embodiment, when a chassis status changes state, such as when buckets are redistributed based on a failed computing device, current connections may be adjusted by shutting down invalid connections and/or creating new connections based on the new bucket distribution. In some embodiments, the chassis may send resets for packets arriving with no existing connection or reset connections for which the arriving packet no longer owns the bucket.

In other embodiments, the primary chassis may act as a full proxy between a first device, such as client device 102 of FIG. 1, and a second device, such as server device 105 of FIG. 1. In one embodiment, a full proxy primary chassis may include incoming connections that terminate at the primary chassis and outgoing connections that also terminate at the primary chassis. In some embodiments, payload data received in packets of an incoming connection may be conveyed to an outgoing connection. To establish an outgoing connection, the primary chassis may select packet attributes to determine buckets via random or calculated algorithms, as described above, such that a same computing device processes both the incoming connection and the outgoing connection. In some embodiments, the outgoing connection attributes may match the requirements of the second connection enabling both first and outgoing connections to be hashed to the same computing device on the failover chassis.

The process then terminates at a return block.

It will be understood that figures, and combinations of steps in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. These program instructions may be stored on a computer readable medium or machine readable medium, such as a computer readable storage medium.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware-based systems which perform the specified actions or steps, or combinations of special purpose hardware and computer instructions.

The above specification, examples, and data provide a complete description of the manufacture and use of the composition of the described embodiments. Since many embodiments can be made without departing from the spirit and scope of this description, the embodiments reside in the claims hereinafter appended.

What is claimed as new and desired to be protected by Letters Patent of the United States is:

1. A method comprising:
  employing a connection disaggregation device (DAG) including a processor and a memory that is arranged to store instructions that, when executed by the processor, cause the DAG to perform actions, including:
    receiving packets of a first connection from a client device, wherein the first connection is provided for a primary chassis that is associated with a plurality of buckets;
    routing the packets of the first connection to a computing device of a plurality of computing devices, and wherein the primary chassis is operative as a full proxy between the client device and one of the plurality of computing devices; and
    routing the packets of the first connection to the computing device that corresponds to one mapped bucket of a plurality of buckets that are mapped to the plurality of computing devices; and
  the computing device including another processor storing instructions that, when executed by the other processor, cause the computing device to perform actions, including:
    receiving the routed packets of the first connection; and
    selecting a first attribute and a second attribute for a second connection to a failover chassis, wherein the failover chassis routes the second connection to a bucket of another plurality of buckets corresponding to the mapped bucket.

2. The method of claim 1, wherein the failover chassis routes the second connection to one of a second plurality of computing devices by:
  hashing a combination of the first attribute and the second attribute of the second connection to a hash value;
  mapping the hash value to a bucket of the second plurality of buckets; and
  routing the second connection to the one of the second plurality of computing devices corresponding to the bucket of the second plurality of buckets.

3. The method of claim 2, wherein the combination of the first attribute and the second attribute is determined based on a third attribute.

4. The method of claim 1, wherein the first attribute is a Transmission Control Protocol (TCP) source port number and the second attribute is a TCP destination port number.

5. The method of claim 1, wherein the computing device selects the first attribute and the second attribute by applying, to randomly selected first attributes and second attributes, a same algorithm the failover chassis uses to route a connection to one of the other plurality of buckets until a combination of a first attribute and a second attribute is identified that maps to the bucket of the other plurality of buckets.

6. The method of claim 1, wherein the computing device selects the second attribute to be a second attribute of the packets of the first connection and wherein the computing device selects the first attribute by randomly selecting first attributes and applying a same algorithm the failover chassis uses to route a connection to one of the second plurality of buckets until a first attribute is identified that, when combined with the second attribute of the packets of the first connection, the combination causes the failover chassis to route the second connection to the bucket of the other plurality of buckets corresponding to the mapped bucket.

7. The method of claim 1, wherein the first attribute and the second attribute are selected based on a list of pre-computed values for each bucket in the plurality of buckets, wherein the pre-computed values are calculated from a plurality of combinations of attributes.

8. The method of claim 1, wherein each of the buckets is numbered, and wherein a bucket of the plurality of buckets corresponds to a bucket of the second plurality of buckets when both buckets have the same number.

9. The method of claim 1, wherein the first attribute and the second attribute are combined by concatenating a string representation of the first attribute and a string representation of the second attribute.

10. The method of claim 1, wherein the DAG further performs actions, including:
  receiving a packet from the failover chassis, wherein the first attribute of the packet comprises the second attribute of the second connection and the second attribute of the packet comprises the first attribute of the second connection;
  hashing a combination of the first attribute of the packet and the second attribute of the packet to a hash value; and
  mapping the packet to a bucket of the plurality of buckets based on the hash value, wherein the packet is mapped to a bucket corresponding to the bucket the second connection was mapped to by the failover chassis.

11. The method of claim 1, wherein a first attribute of the packets of the first connection is in use by the computing device such that the first attribute of the second connection is selected to be other than the first attribute of the packets of the first connection.

12. The method of claim 1, wherein the computing device perform further actions, including:
  reestablishing the second connection with the failover chassis if a status of the failover chassis changes, wherein the status of the failover chassis changes upon failure of at least one of a second plurality of computing devices within the failover chassis; and
  conveying current connection information to the failover chassis.

13. The method of claim 1, wherein the failover chassis includes a second plurality of computing devices, wherein each of the second plurality of computing devices is associated with a non-overlapping sub-set of the second plurality of buckets, and wherein the failover chassis includes a health status table that maps buckets to computing devices based on which of the second plurality of computing devices are operational.

14. An apparatus comprising:
  a primary chassis comprising a processor and a hardware memory that is arranged to store instructions that, when executed by the processor, causes the primary chassis to perform actions including:
    receiving packets of a first connection from a client device, wherein the first connection is provided for the primary chassis that is associated with a plurality of buckets;
    routing the packets of the first connection to a computing device of a plurality of computing devices, and wherein the primary chassis is operative as a full proxy between the client device and one of the plurality of computing devices; and
    routing the packets of the first connection to the computing device that corresponds to one mapped bucket of a plurality of buckets that are mapped to the plurality of computing devices; and wherein the computing device includes another processor storing instructions that, when executed by the other processor, cause the computing device to perform actions, including:
receiving the routed packets of the first connection; and
selecting a first attribute and a second attribute for a second connection to a failover chassis, wherein the failover chassis routes the second connection to a bucket of another plurality of buckets corresponding to the mapped bucket.

15. The apparatus of claim 14, wherein the primary chassis includes a plurality of computing devices, and wherein the primary chassis routes the packets of the first connection to one of the plurality of primary chassis computing devices based on a hash of a combination of two attributes of the packets of the first connection.

16. The apparatus of claim 14, wherein the first attribute includes a Transmission Control Protocol (TCP) source port number and the second attribute includes a TCP destination port number.

17. The apparatus of claim 14, wherein an algorithm of the primary chassis for routing the packets of the first connection to one of the plurality of buckets associated with the primary chassis is a same algorithm of the failover chassis for routing the second connection to a bucket of the other plurality of buckets.

18. The apparatus of claim 14, wherein the primary chassis performs further actions, including:
conveying an algorithm to the failover chassis for routing the second connection to a bucket of the other plurality of buckets.

19. A non-transitory processor readable storage media storing processor readable instructions that when executed by a processor perform actions comprising:
employing a connection disaggregation device (DAG) including a processor and a memory that is arranged to store instructions that, when executed by the processor, cause the DAG to perform actions, including:
receiving packets of a first connection from a client device, wherein the first connection is provided for a primary chassis that is associated with a plurality of buckets;
routing the packets of the first connection to a computing device of a plurality of computing devices, and wherein the primary chassis is operative as a full proxy between the client device and one of the plurality of computing devices; and
routing the packets of the first connection to the computing device that corresponds to one mapped bucket of a plurality of buckets that are mapped to the plurality of computing devices; and
the computing device including another processor storing instructions that, when executed by the other processor, cause the computing device to perform actions, including:
receiving the routed packets of the first connection; and
selecting a first attribute and a second attribute for a second connection to a failover chassis, wherein the failover chassis routes the second connection to a bucket of another plurality of buckets corresponding to the mapped bucket.

20. The media of claim 19, wherein the failover chassis routes the second connection to one of a second plurality of computing devices by:
hashing a combination of the first attribute and the second attribute of the second connection to a hash value;
mapping the hash value to a bucket of the second plurality of buckets; and
routing the second connection to the one of the second plurality of computing devices corresponding to the bucket of the second plurality of buckets.

* * * * *